US008677350B2

(12) United States Patent
Yook

(10) Patent No.: US 8,677,350 B2
(45) Date of Patent: *Mar. 18, 2014

(54) SYSTEM AND METHOD FOR MANAGING AN APPLICATION OR SOFTWARE COMPONENT FOR USE IN A DEVICE TO BE CONTROLLED IN A HOME NETWORK

(75) Inventor: Hyungyoo Yook, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 527 days.

This patent is subject to a terminal disclaimer.

(21) Appl. No.: 12/551,656

(22) Filed: Sep. 1, 2009

(65) Prior Publication Data

US 2010/0070616 A1 Mar. 18, 2010

Related U.S. Application Data

(63) Continuation of application No. 10/685,407, filed on Oct. 16, 2003.

(30) Foreign Application Priority Data

Jan. 2, 2003 (KR) .................. 10-2003-0000058

(51) Int. Cl.
*G06F 9/445* (2006.01)
*G06F 15/16* (2006.01)

(52) U.S. Cl.
USPC ............................ 717/176; 717/174; 709/203

(58) Field of Classification Search
USPC .......... 717/120, 121, 168–178; 709/201–203, 709/220–222
See application file for complete search history.

(56) References Cited

U.S. PATENT DOCUMENTS

| 6,085,236 A | 7/2000 | Lea |
| 6,363,434 B1 | 3/2002 | Eytchison |
| 6,618,764 B1 | 9/2003 | Shteyn |
| 6,654,821 B1 | 11/2003 | Aikawa et al. |
| 6,694,349 B1 | 2/2004 | Zou |
| 6,725,281 B1 * | 4/2004 | Zintel et al. ................. 719/318 |
| 6,768,926 B2 | 7/2004 | Webster et al. |
| 6,779,004 B1 * | 8/2004 | Zintel ......................... 709/227 |

(Continued)

FOREIGN PATENT DOCUMENTS

| JP | 2001-53779 A | 2/2001 |
| JP | 2004-213612 A | 7/2004 |

(Continued)

OTHER PUBLICATIONS

"UPnP Device Architecture 1.0," Jun. 13, 2000, p. 1-40.*

(Continued)

*Primary Examiner* — Qing Chen
(74) *Attorney, Agent, or Firm* — Sughrue Mion, PLLC

(57) ABSTRACT

The present invention relates to a system and method for managing an application wherein a function of a controlled device can be dynamically extended by continually updating the application for use in the controlled device. According to the present invention, a framework capable of providing integrated support to a variety of home network middleware is loaded on an application server corresponding to a control device, and Internet access services and middleware services for accessing various kinds of devices are bundled into the framework. Thus, application installation and management can be performed within a home network environment regardless of the hardware, network protocol and operating system used.

12 Claims, 8 Drawing Sheets

(56) References Cited

U.S. PATENT DOCUMENTS

| | | | |
|---|---|---|---|
| 6,907,301 B2 | 6/2005 | Kou et al. | |
| 6,910,068 B2 * | 6/2005 | Zintel et al. | 709/220 |
| 6,924,727 B2 | 8/2005 | Nagaoka et al. | |
| 7,058,719 B2 | 6/2006 | Motoyama | |
| 7,130,895 B2 * | 10/2006 | Zintel et al. | 709/220 |
| 7,165,259 B2 * | 1/2007 | Szucs et al. | 719/328 |
| 7,206,853 B2 | 4/2007 | Eytchison et al. | |
| 7,293,236 B2 * | 11/2007 | Choi et al. | 715/734 |
| 7,403,982 B2 | 7/2008 | Tanaka et al. | |
| 2001/0038392 A1 | 11/2001 | Humpleman et al. | |
| 2002/0029256 A1 * | 3/2002 | Zintel et al. | 709/218 |
| 2002/0035621 A1 * | 3/2002 | Zintel et al. | 709/220 |
| 2002/0073244 A1 | 6/2002 | Davies et al. | |
| 2002/0078161 A1 * | 6/2002 | Cheng | 709/208 |
| 2002/0078293 A1 * | 6/2002 | Kou et al. | 710/305 |
| 2002/0087964 A1 | 7/2002 | Sullivan | |
| 2002/0107583 A1 * | 8/2002 | Webster et al. | 700/19 |
| 2002/0147791 A1 * | 10/2002 | Choi | 709/217 |
| 2002/0150048 A1 * | 10/2002 | Ha et al. | 370/231 |
| 2002/0156947 A1 * | 10/2002 | Nishio | 710/36 |
| 2002/0163534 A1 * | 11/2002 | Choi et al. | 345/734 |
| 2002/0180579 A1 * | 12/2002 | Nagaoka et al. | 340/3.1 |
| 2003/0009588 A1 | 1/2003 | Bodlaender | |
| 2003/0009597 A1 | 1/2003 | Joung | |
| 2003/0014521 A1 | 1/2003 | Elson et al. | |
| 2003/0033373 A1 * | 2/2003 | Szucs et al. | 709/217 |
| 2003/0041127 A1 * | 2/2003 | Turnbull | 709/220 |
| 2003/0046437 A1 * | 3/2003 | Eytchison et al. | 709/250 |
| 2003/0121032 A1 * | 6/2003 | Cho et al. | 717/173 |
| 2003/0122866 A1 | 7/2003 | Yook | |
| 2003/0149811 A1 * | 8/2003 | Lee et al. | 710/33 |
| 2003/0158956 A1 | 8/2003 | Tanaka et al. | |
| 2004/0015575 A1 * | 1/2004 | Motoyama | 709/222 |
| 2004/0120344 A1 * | 6/2004 | Sato et al. | 370/465 |
| 2004/0133896 A1 * | 7/2004 | Lym et al. | 719/315 |
| 2004/0139177 A1 | 7/2004 | Yook | |
| 2010/0070616 A1 | 3/2010 | Yook | |

FOREIGN PATENT DOCUMENTS

| | | |
|---|---|---|
| KR | 2001-0033879 A | 4/2001 |
| KR | 2001-0112506 A | 12/2001 |
| WO | 02/09350 A2 | 1/2002 |
| WO | 02/078385 A1 | 10/2002 |

OTHER PUBLICATIONS

Marples et al., "The Open Services Gateway Initiative: An Introductory Overview," Dec. 2001, IEEE, p. 110-114.*

Miller et al., "Home Networking with Universal Plug and Play," Dec. 2001, IEEE, p. 104-109.*

Microsoft Computer Dictionary, Fifth Edition, 2002, Microsoft Press.*

Dobrev et al., "Device and Service Discovery in Home Networks with OSGi," Aug. 2002, IEEE, p. 86-92.*

T. Yamaguchi, et al., "Concept and Evaluation of residential gateway server", TSUBASA, Information Technology R & D Center, Mitsubishi Electric Corporation, Mar. 21, 2001, pp. 55-61.

Open Services Gateway Initiative, "OSGI Service Platform," Release 2, pp. 1-282, Oct. 2001.

Jiang Xialuo and Zhu Haitao "Information Appliance and Intelligent Home Network," Wenzhou University, Information Science and Eng'g Dept., Sep. 13, 2002, pp. 1-4.

Matsui et al., "Development of a Home Network in which the Reflection of User's Voice is Indespensible," Computopia, Sep. 1, 2001, pp. 122-123.

Thompson et al., "UNIX Programmer's Manual," Nov. 1971.

Baier et al., "Multimedia Middleware for the Future Home," Oct. 2001, ACM, p. 48-51.

Bell et al., "A Call for the Home Media Network," Jul. 2002, ACM, p. 71-75.

Nakajima, Tatsuo, "Experiences with Building Middleware for Audio and Visual Networked Home Appliances on Commodity Software," Dec. 2002, ACM, p. 611-620.

Nakazawa et al., "A Pluggable Service-to-Service Communication Mechanism for Home Multimedia Networks," Dec. 2002, ACM, p. 621-630.

Communication dated May 22, 2012, issued by Japanese Patent Office, in counterpart Japanese Application No. 2009-258349.

Communication, dated Dec. 18, 2012, issued by the Japanese Patent Office in counterpart Japanese Patent Application No. 2009-258349.

Association for the Advancement of HAVi, AV home network specification HAVi, bit, Kyoritsu Publishing Co., Ltd., Oct. 1, 2000, vol. 32, No. 10, pp. 17-24.

* cited by examiner

SYSTEM AND METHOD FOR MANAGING AN APPLICATION OR SOFTWARE COMPONENT FOR USE IN A DEVICE TO BE CONTROLLED IN A HOME NETWORK

CROSS-REFERENCE TO RELATED APPLICATION

This is a continuation of application Ser. No. 10/685,407 filed Oct. 16, 2003, which claims priority under 35 USC 119 from Korean Patent Application No. 10-2003-0000058. The entire disclosures of the prior applications are incorporated by reference herein.

BACKGROUND OF THE INVENTION

1. Field of the Invention

The present invention relates to a system and a method for managing an application or software component for use in a device to be controlled in a home network environment, and more particularly, to a system and a method for managing an application wherein a function of a device to be controlled can be dynamically extended by continually updating the application for use in the appliance. The present application is based on Korean Patent Application No. 10-2003-0000058, which is incorporated herein by reference.

2. Description of the Related Art

A home network system is a system for connecting and controlling PCs, peripheral equipment, mobile phones, electric home appliances, and the like through one network. A proposed method to configure the home network system is such that a common virtual computer environment called middleware is built into home appliances, and applications are provided for the appliances. Here, the middleware is capable of communicating between appliances in a home network. The currently available middleware includes home AV interoperability (HAVi), universal plug and play (UPnP™), Jini™, home wide web (HWW), and the like.

However, as functions of appliances improve and become more complicated, the need to install the latest application in addition to the application already installed upon purchase thereof has increased. For example, if a TV can support a high-quality sound format (e.g., surround sound, stereo, etc.) but a poor tuner cannot support the high-quality format, the high-quality format cannot be used.

According to such a trend, technologies for providing new applications for use in controlled devices have developed. For example, Korean Patent Application No. 2000-7007449 (of which the title of invention is a method and system related an audio/video network) discloses a method capable of supporting a more superior performance through a device driver updated in such a manner that the device driver is updated when the appliance to be controlled is connected with the home network system.

FIGS. 1 and 2 are diagrams illustrating a method of installing a conventional application, and illustrate a method of installing the application in a HAVi home network system in which a control device, i.e. full AV device (FAV), capable of installing and executing the application based on the IEEE 1394 and a controlled device, i.e. base AV device (BAV), are connected with each other.

Here, the IEEE 1394 is a high-speed serial bus (interface) for connecting several appliances in the home with one another, and a device control module (DCM) is a software component for controlling the appliance to be controlled, i.e. an application programming interface (API) needed when a user intends to use a function of a device. In particular, the DCM is obtained by installing a bytecode of the DCM and should exist in the FAV in order to control the device. Further, the bytecode of the DCM may reside in the BAV or exist at other locations, e.g. at a file server on the Internet.

As shown in FIG. 1, in a case where a bytecode 121 of a DCM resides in a BAV 120, an FAV 110 causes the bytecode 121 of the DCM to be loaded from a memory of the BAV 120 and the loaded bytecode to be installed therein, when the BAV 120 is connected with the home network system. Alternatively, as shown in FIG. 2, in a case where a bytecode 231 of a DCM resides in a file server 230, an FAV 210 causes a URL of the DCM to be read from a memory of a BAV 220 and then causes the read bytecode 231 to be loaded from the file server 230 and the loaded bytecode to be installed therein, when the BAV 220 is connected with the home network system.

However, such an application installation method is restrictively applied to the HAVi home network based on the IEEE 1394 technique, because it can be executed only with the IEEE 1394 for supporting a hot plug-and-play. Further, since it is determined that the FAV should install and manage the application, there is a problem in that a large load is imposed on the FAV due to operations of installing and managing the applications for the several BAVs connected with the home network.

Furthermore, since the FAV is configured to install the DCM only once upon initial connection of the BAVs with the home network, there is another problem in that it is difficult to provide continual application update services.

SUMMARY

Accordingly, the present invention is contemplated to solve the above problems in the prior art. An object of the present invention is to provide a system and method for managing an application which can be independently operated in a home network environment.

Another object of the present invention is to provide a system and method for managing an application, wherein a function of a controlled device can be dynamically extended by allowing a control device and the controlled device to control installation and management of the application and continually updating the application for use in the controlled device.

According to an aspect of the present invention for accomplishing the objects, there is provided an application management system comprising a plurality of controlled devices and an application server, wherein the application server performs the installation and management of applications for the controlled devices by using a framework capable of providing integrated support to a variety of home network middleware.

Further, the application management system of the present invention may comprise an application server loaded with a framework capable of providing integrated support to a variety of home network middleware, and the controlled devices which control the application server and perform installation and management of applications for the controlled devices.

Furthermore, the home network middleware may be selected from a group consisting of HAVi, UPnP™, Jini™ and HWW.

Preferably, the framework is an OSGi™ framework.

More preferably, the framework provides Internet access services and home network middleware services.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, preferred embodiments of the present invention will be described with reference to the accompanying drawings.

In the present invention, the configuration of an application management system may vary according to which one of a control device and a controlled device can manage the application. More specifically, the application management system of the present invention may be divided into two types: a pull mode in which the application server (control device) becomes a subject of management and performs the application installation and management, and a push mode in which the controlled device becomes a subject of management and performs the application installation and management.

First, the application management system in the pull mode in which the application server becomes the subject of management and performs the application installation and management will be explained with reference to FIG. 3.

Figure 1:
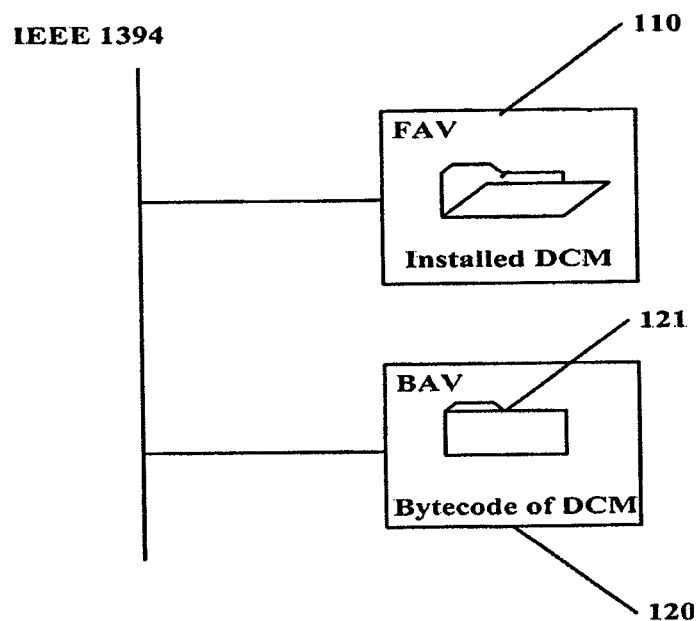
FIGS. 1 and 2 are diagrams illustrating a method for installing an application according to a prior art.
Figure 2:
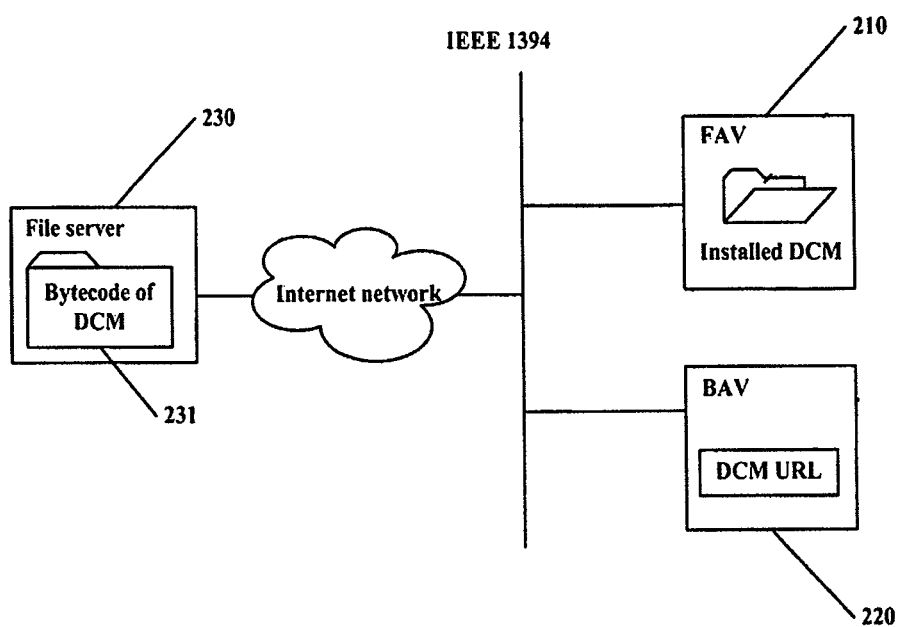
Figure 3:
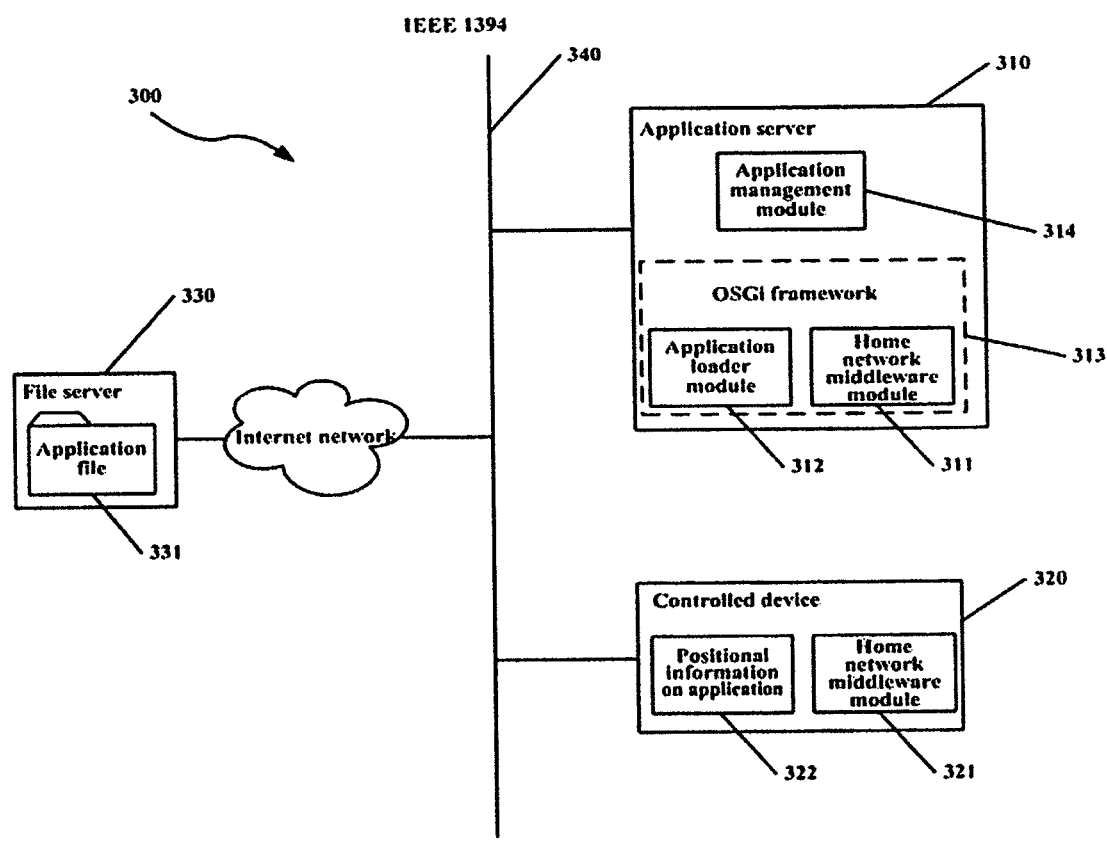
FIG. 3 is a diagram illustrating a schematic configuration of a system for managing an application according to a first embodiment of the present invention.

FIG. 3 is a diagram illustrating a schematic configuration of an application management system according to a first embodiment of the present invention. As shown in the figure, the application management system 300 comprises an application server 310, a controlled device 320 and a file server 330. The application server 310 and the controlled device 320 are connected with each other through a home network 340.

The application server 310 includes a home network middleware module 311 for communicating with the controlled device 320, an application loader module 312 for downloading an application file 331 from the file server 330, and an application management module 314 for controlling operations of the home network middleware module 311 and the application loader module 312. An open services gateway initiative (OSGi) framework 313 is loaded on the application server 310, and the home network middleware module 311 and the application loader module 312 are bundled into the OSGi framework 311.

Here, the reason that the OSGi framework 313 is loaded on the application server 310 and the home network middleware module 311 and the application loader module 312 are bundled into the OSGi framework 311 is that an independent home network system can be implemented into a middleware. Hereinafter, for better understanding of the present invention, the OSGi framework will be more specifically described.

The home network system for configuring a digital network in the home is based on a variety of application fields and living environments. Thus, several limitations are accompanied when implementing the home network system.

That is, in the home network system, various electric home appliances including information appliances such as computer, printer and fax machine, AV appliances such as TV, audio, video and DVD, and control devices such as light, door lock, air conditioner and washing machine are complexly connected with one another. Further, the electric home appliances use different communication media such as power line communication (PLC), Ethernet, Bluetooth and IEEE 1394. Thus, in order to ensure reliability and stability of the home network system, the home network system should be implemented in such a manner that it can be compatible with all the electric home appliances. In other words, the home network system should be implemented independently of the middleware.

Accordingly, in the present invention, the OSGi framework 313 into which middleware services for accessing various kinds of devices are bundled is loaded on the application server 310 so that smooth communication can be made in the home network environment regardless of hardware, network protocol, operating system, and the like, whereby a home network system can be implemented independently of the middleware.

The OSGi is a specification for dynamic installation and execution of new services in home network appliances, and provides interworkability between home network middleware such as UPnP™, Jini™ and LonTalk so that devices using different forms of middleware can be mutually controlled. Since such an OSGi technique is described in detail in a paper "OSGi Service Platform release 2" announced on October of 2001 by the OSGi, the detailed description thereof will be omitted.

Meanwhile, the controlled device 320 includes a home network middleware module 321 for communicating with the application server 310 and positional information 322 on the application file to be installed. The application files 331 for all the electric home appliances in the home are stored in the file server 330.

That is, when the controlled device 320 is connected with the home network 340, the application server 310 detects through the home network middleware module 311 that the controlled device 320 has been connected, extracts the positional information 322 on the application file to be installed from the controlled device 320 through the application loader module 312, and downloads an application file from the file server 330 so as to install the relevant application in accordance with the extracted positional information on the downloaded application file.

Figure 4:
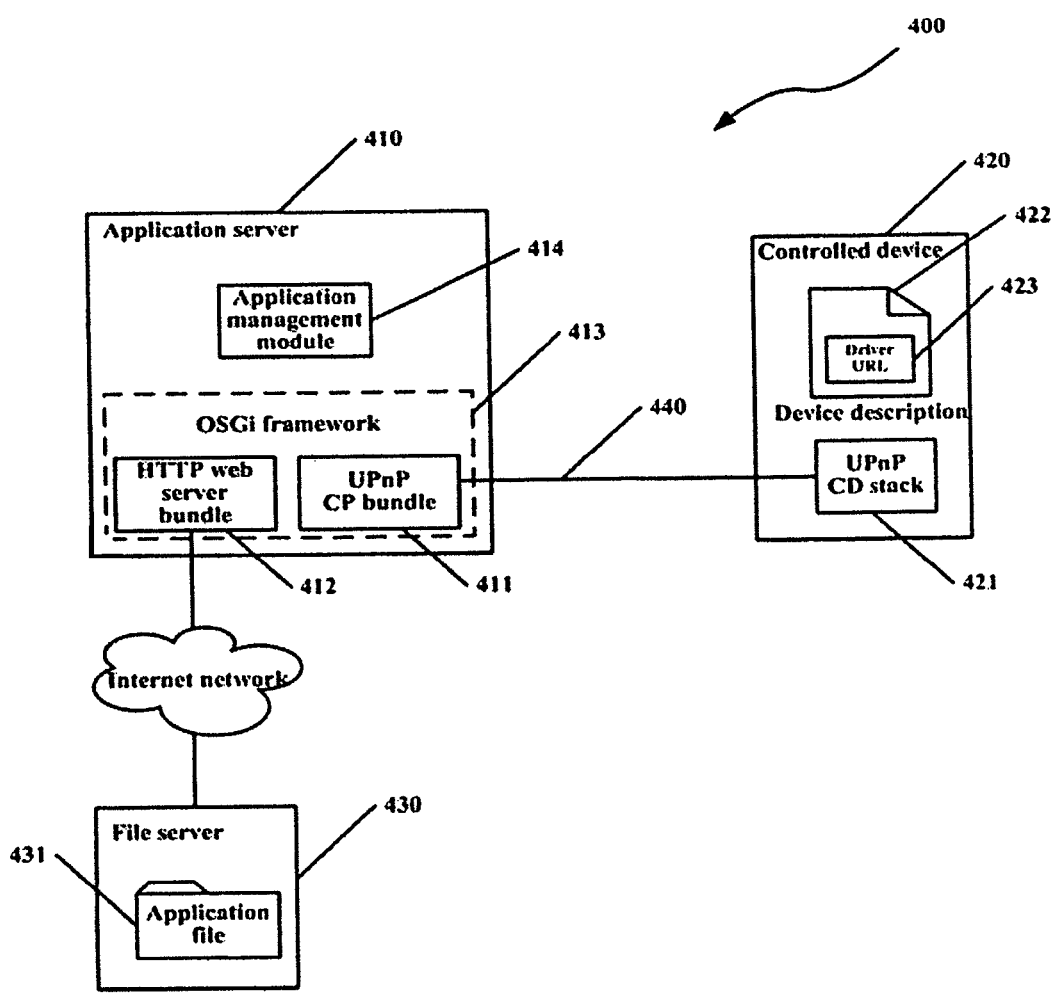
FIG. 4 is a diagram illustrating an actual configuration of the system for managing an application according to the first embodiment of the present invention.

FIG. 4 illustrates an actual configuration of an application management system implemented in an application server pull mode. As shown in the figure, the application management system 400 comprises an application server 410, a controlled device 420 and a file server 430. Further, the application server 410 and the controlled device 420 are connected with each other through a home network 440.

The application server 410 includes a UPnP™ control point (CP) bundle 411 for controlling UPnP™ devices, an hypertext transfer protocol (HTTP) web server bundle 412 for downloading an application file from the file server 430, and an application management module 414 for controlling operations of the UPnP™ CP bundle 411 and the HTTP web server bundle 412. The UPnP™ CP bundle 411 and the HTTP web server bundle 412 are bundled into an OSGi framework 413.

The controlled device 420 includes a UPnP™ controlled device (CD) stack 421 for notifying its presence to and receiving commands from the application server 410, and a device description 422 for driving the controlled device 402. Positional information 423 (e.g., uniform resource locator (URL) information on drivers) is stored in the device description 422.

Here, the UPnP™ corresponds to an extended version of the plug-and-play concept for connecting a conventional PC and peripheral equipment, and is a software technology by which all devices as well as PC peripheral equipment can be configured into a single network without additional settings as soon as they are installed. The UPnP™ devices may be logically divided into a control point (CP) corresponding to a client that directly uses the services according to roles in the home network and a controlled device (CD) corresponding to a device or software capable of communicating with the CP. In such a case, the party that first requested the service acts as the CP, whereas the other party acts as the CD. The CP searches for UPnP™ devices on the UPnP™ network, or receives event messages generated when the UPnP™ devices are newly connected with or disconnected from the network.

That is, when the controlled device 420 is connected with the home network, the application management module 414 of the application server 410 extracts the positional information 423 on the application file to be installed from the controlled device 420 through the UPnP™ CP bundle 411 and downloads the application file 431 from the file server 430 through the HTTP web server bundle 412 so as to install the relevant application. A method of causing the application server 410 to perform the application installation and management will be later described in detail with reference to FIG. 7.

In the meantime, the application management system may be implemented in the controlled device push mode in addition to an application server pull mode. Hereinafter, an application management system implemented in the controlled device push mode will be explained with reference to FIG. 5.

Figure 5:
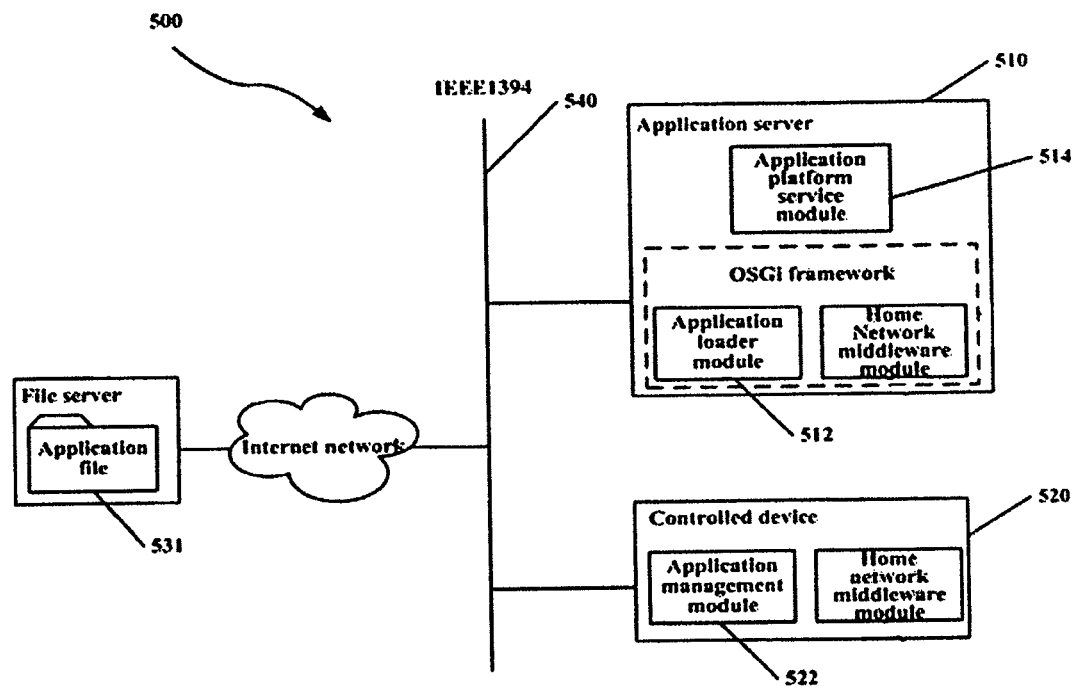
FIG. 5 is a diagram illustrating a schematic configuration of a system for managing an application according to a second embodiment of the present invention.

FIG. 5 is a diagram illustrating a schematic configuration of an application management system according to a second embodiment of the present invention. As shown in the figure, the application management system 500 implemented in the controlled device push mode is configured in such a manner that a controlled device 520 includes an application management module 522 and an application server 510 includes an application platform service module 514, contrary to that implemented in the application server pull mode.

When the controlled device 520 is connected with a home network 540, the application management module 522 of the controlled device 520 controls the application platform service module 514 of the application server 510, and thus, installs a new application or continuously manages the installed application. This process will be described in detail, as follows.

In a case where it is necessary to install a new application, the application management module 522 determines the location where the relevant application will be downloaded, and then requests the application platform service module 514 to install the necessary application. In response to this request, the application platform service module 514 controls an application loader module 512 to download an application file 531 for the home appliance from a file server 530, and then, causes the application for the controlled device 520 to be installed by executing the downloaded application file.

Further, in a case where it is necessary to delete or update an already installed application, the application management module 522 requests the application platform service module 514 to delete or update the application. In response to this request, the application platform service module 514 deletes or updates the relevant application from or in the application server 510, and then, notifies the controlled device 520 of the execution result.

Figure 6:
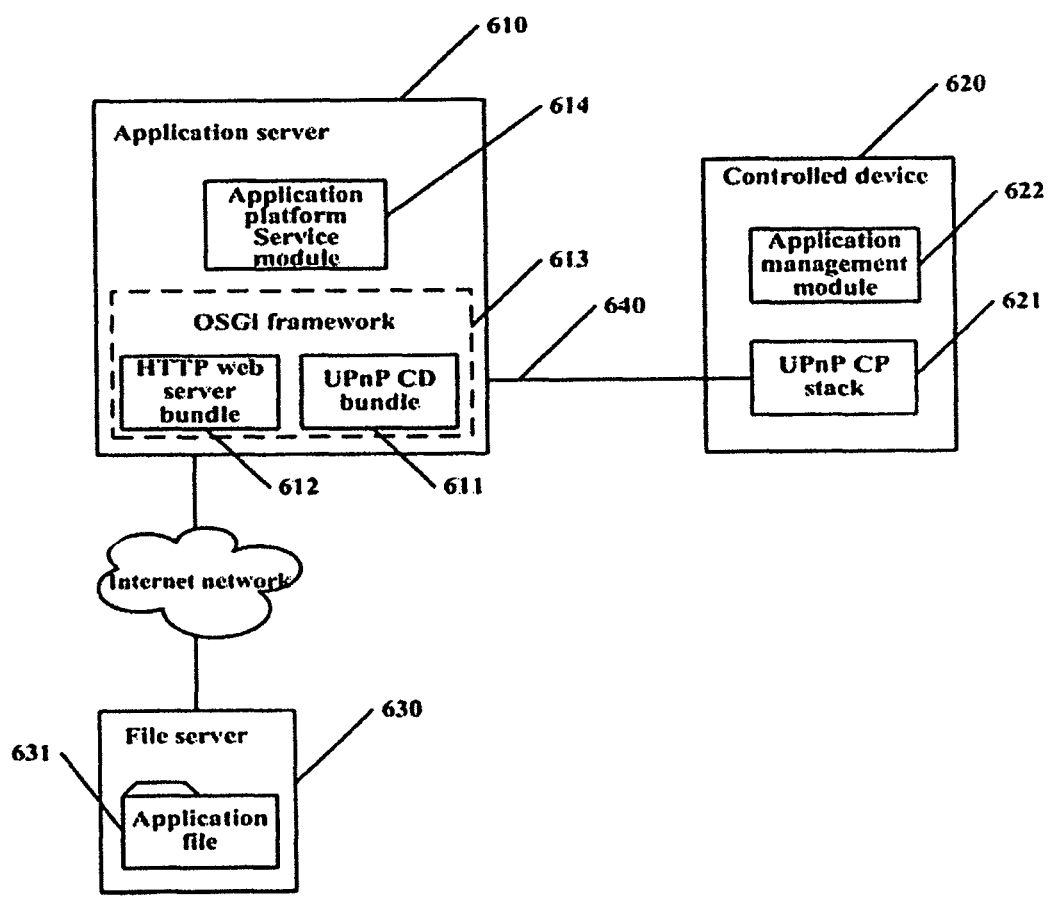
FIG. 6 is a diagram illustrating an actual configuration of the system for managing an application according to the second embodiment of the present invention.

FIG. 6 illustrates an actual configuration of an application management system implemented in a controlled device push mode.

An application server 610 includes a UPnP™ CD bundle 611 for notifying its presence to and receiving commands from a controlled device 620, an HTTP web server bundle 612 for downloading an application file 631 from a file server 630, and an application platform service module 614 for installing and managing the application under the control of the controlled device 620. Here, the UPnP™ CD bundle 611 and the HTTP web server bundle 612 are bundled into an OSGi framework 613.

The controlled device 620 includes a UPnP™ CP stack 621 for transmitting control commands related to application management to the application server 610, and an application management module 622 for controlling a general operation related to application management. A method of managing the application in the controlled device push mode will be later described in detail with reference to FIG. 8.

Hereinafter, the method of managing the application according to the present invention will be explained in detail with reference to the accompanying drawings.

First, the method of managing the application in the pull mode in which the application server becomes the subject of management and performs the application installation and management will be explained with reference to FIG. 7.

Figure 7:
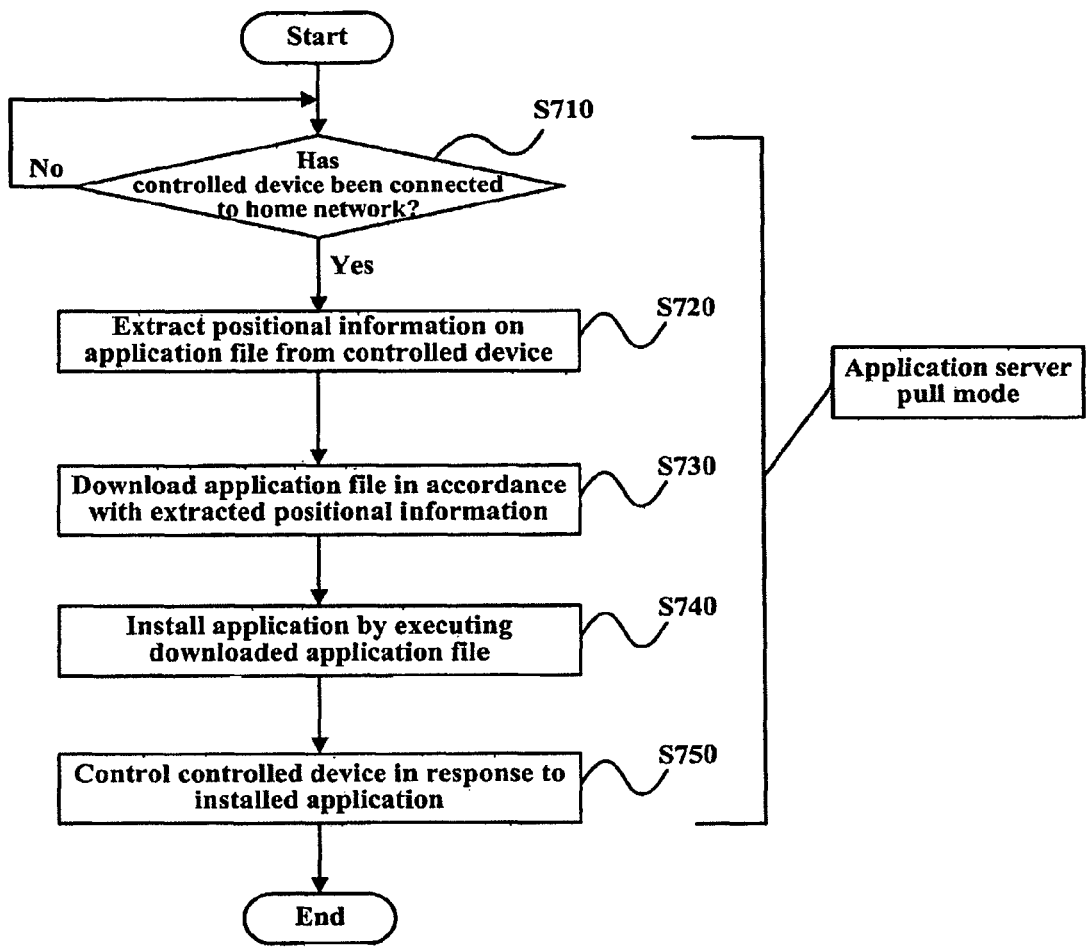
FIG. 7 is a flowchart illustrating the method for managing the application according to the first embodiment of the present invention.

FIG. 7 is a flowchart illustrating the method for managing the application in the application server pull mode. For a better understanding of the present invention, the method of managing the application according to the application server pull mode will be hereinafter explained more specifically with reference to the home network system, for example, configured as in FIG. 4.

When the controlled device 420 is connected with the home network 440, the UPnP™ CP bundle 411 in the application server 410 detects that the controlled device 420 has been connected to the home network, and then, notifies the application management module 414 of the presence of the controlled device 420 through an event mechanism (S710).

Then, the UPnP™ CP bundle 411 analyzes the device description 422 of the controlled device, extracts the positional information 423 (e.g., the URL information on the drivers), and transmits the extracted information to the application management module 414 (S720).

Next, the application management module 414 controls the HTTP web server bundle 412 and downloads the application file 431 for the controlled device 420 from the file server 430 in accordance with the positional information 423 on the application file input from the UPnP™ CP bundle 411 (S730). After the download has been completed, the application management module 414 executes the downloaded application file 431 to install the relevant application (S740).

Thereafter, the application management module 414 controls the controlled device in response to the installed application (S750). For example, the application management module can perform operations of using a printout function or turning off an audio in a TV with an application platform service function.

Now, the method of managing the application in the push mode in which the controlled device becomes the subject of management and performs the application installation and management will be explained with reference to FIG. 8.

Figure 8:
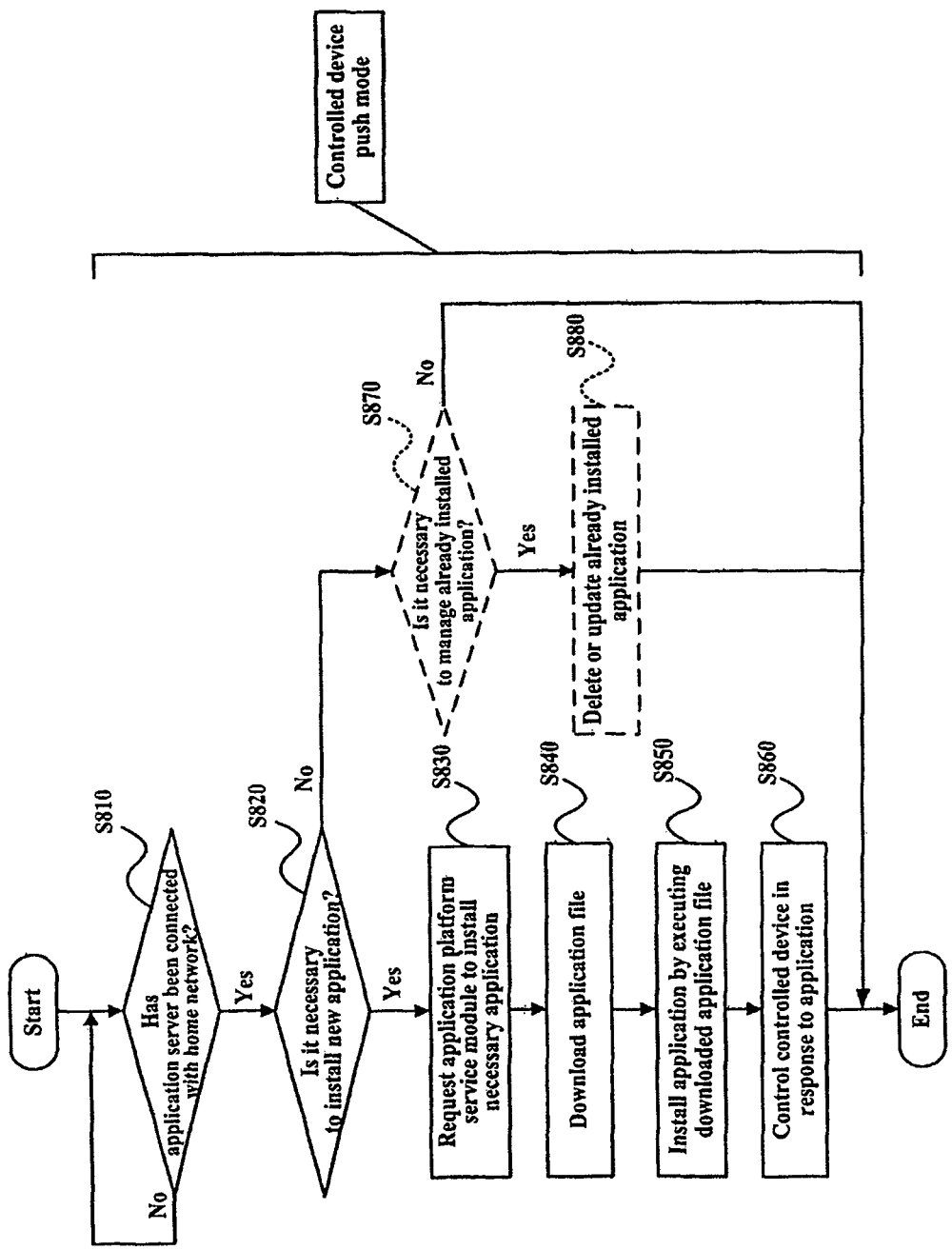
FIG. 8 is a flowchart illustrating the method for managing the application according to the second embodiment of the present invention.

FIG. 8 is a flowchart illustrating the method for managing the application in the controlled device push mode. For better understanding of the present invention, the method of managing the application according to the application server push mode will be hereinafter explained more specifically with reference to the home network system, for example, configured as in FIG. 6.

When a controlled device 620 is connected with the home network 640, the UPnP™ CP stack 621 of the controlled device 620 searches through communication with the UPnP™ CD bundle 611 of the application server 610 to determine whether the application server 610 with the application platform service module 614 is connected with the home network 640 (S810).

At this time, if the application server 610 with the application platform service module 614 is connected with the home network 640, the UPnP™ CP stack 621 of the controlled device 620 notifies the application management module 622 of the presence of the application server 610 through the event mechanism.

Then, the application management module 622 of the controlled device 620 judges whether a new application should be installed (S820). If a new application should be installed, the application management module determines the download location of the relevant application and requests the application platform service module 614 to install the necessary application (S830).

Thereafter, in response to the requested commands for installing the relevant application, the application platform service module 614 controls the HTTP web server bundle 612 and downloads the application file from the file server (S840). After the download has been completed, the application platform service module 614 executes the downloaded application file to install the relevant application (850).

If the application is installed in the application server 610 according to a control process of the controlled device 620, the application management module 622 of the controlled device 620 controls the controlled device 620 connected with the home network 640 through the installed application (S860).

On the other hand, in a case where it is necessary to delete or update an already installed application, the application management module 622 requests the application platform service module 614 to delete or update the relevant application. In response to the request, the application platform service module 614 performs the operations of deleting or updating the relevant application and then notifies the controlled device 620 of the execution result (S870 and S880).

As described above, according to the present invention, the application installation and management for the controlled device can be made regardless of the kinds of middleware within the home network environment. Thus, the function of controlled device can be dynamically extended through the continual update of applications for the controlled device.

Further, both the application server and the controlled device can perform the application installation and management. Thus, the application management can be performed more efficiently by using either the application server pull mode to be used for electric home appliances that have poor operation capabilities or need no additional upgrade services, or the controlled device push mode to be used for electric home appliances that have good operation capabilities and need various and continuous application upgrade services.

Although the present invention has been described in connection with the preferred embodiments shown in the drawings, they are mere examples of the present invention. It will be understood by those skilled in the art that various modifications, changes and equivalents thereof can be made within the scope and spirit of the present invention.

For example, it has been described in the preferred embodiments that the file server is connected with the application server through the Internet network. However, the location where the application files are stored may vary according to the services supported by the application loader module.

Further, it has been described in the embodiments that the application for the controlled device is installed when the controlled device is connected. However, it can be changed when the application is installed.

Furthermore, it has been described in the embodiments that the UPnP™ is an example of the middleware for communicating between the devices. However, the present invention is not limited thereto, and middleware such as Jini™, a common object request broker architecture (CORBA) and a distributed component object model (DCOM) may be employed in the present invention.

Moreover, in the embodiments of the present invention, Java-related platforms such as OSGi and JavaBeans™ and technologies for loading operating systems such as Microsoft™ Windows™ and Linux™ can be employed as the application installation technologies.

Accordingly, the true technical scope and spirit of the present invention should be defined by the appended claims.

As described above, according to the present invention, there is an advantage in that the functions of the electric home appliances can be dynamically extended in the home network environment since an application management system operable independently of the home network middleware can be implemented.

Further, according to the present invention, the services for continuously updating the application or providing the application suitable to the characteristics of the home network can be provided, and the controlled devices can also install new applications or manage already installed applications even though the controlling appliance has been implemented to provide simple functions. Therefore, there is also another advantage in that resources can be efficiently utilized.

What is claimed is:
1. An application management system comprising:
a plurality of controlled hardware devices; and
an application server performing installation and management of applications for the plurality of controlled hardware devices by using Internet access services and middleware services for accessing the plurality of controlled hardware devices, wherein the Internet access services and the middleware services are bundled into a framework capable of providing integrated support to a variety of home network middleware,
wherein the application server controls the plurality of controlled hardware devices in response to the installed applications,
wherein each of the plurality of controlled hardware devices includes positional information on an application file to be installed,
wherein the application file is stored in a file server on the Internet,
wherein at least one of the plurality of controlled hardware devices determines whether the application server is connected to a home network and if the application server is connected to the home network, the at least one of the plurality of controlled hardware devices judges whether a new application should be installed in the at least one of the plurality of controlled hardware devices, and wherein the at least one of the plurality of controlled hardware devices does not have a browser.

2. The application management system as claimed in claim 1, wherein the home network middleware is selected from a group consisting of HAVi and HWW.

3. The application management system as claimed in claim 1, wherein the framework is an open services gateway initiative framework.

4. The application management system as claimed in claim 1, wherein each of the plurality of controlled hardware devices includes a home network middleware module configured to communicate with the application server.

5. The application management system as claimed in claim 1, wherein the application server extracts the positional information on the application file from the plurality of controlled hardware devices and downloads the application file from the file server to install a relevant application in response to the extracted positional information.

6. The application management system as claimed in claim 1, wherein the application server includes a home network middleware module configured to communicate with the plurality of controlled hardware devices and extracting the positional information on the application file from the plurality of controlled hardware devices, an application loader module configured to download the application file from the file server in accordance with the extracted positional information on the application file, and an application management module configured to control operations of the home network middleware module and the application loader module.

7. The application management system as claimed in claim 6, wherein the home network middleware module and the application loader module are bundled into the framework.

8. A method for managing an application using an application management system including a plurality of controlled hardware devices and an application server, the method comprising:
  detecting connection of the plurality of controlled hardware devices with a home network by operation of an application using Internet access services and middleware services for accessing the plurality of controlled hardware devices, wherein the Internet access services and the middleware services are bundled into a framework capable of providing integrated support to a variety of home network middleware;
  installing applications in the application server and controlling the plurality of controlled hardware devices in response to the installed applications by the application server;
  determining whether the application server is connected to a home network by at least one of the plurality of controlled hardware devices; and
  if the application server is connected to the home network, judging whether a new application should be installed in the at least one of the plurality of controlled hardware devices,
  wherein each of the plurality of controlled hardware devices includes positional information on an application file,
  wherein the application file is stored in a file server on the Internet, and
  wherein the at least one of the plurality of controlled hardware devices does not have a browser.

9. The method as claimed in claim 8, wherein the home network middleware is selected from a group consisting of HAVi and HWW.

10. The method as claimed in claim 8, wherein the framework is an open services gateway initiative framework.

11. The method as claimed in claim 8, wherein the detecting comprises:
  extracting the positional information on the application file necessary for controlling the plurality of controlled hardware devices by the application server;
  downloading the application file from the file server in accordance with the extracted positional information by the application server; and
  executing the downloaded application file and installing a relevant application by the application server.

12. The method as claimed in claim 8, further comprising an application management step of executing, stopping, deleting, and updating at least one of the applications installed in the application server.

* * * * *